United States Patent [19]

Nielinger et al.

[11] Patent Number: 5,013,518

[45] Date of Patent: May 7, 1991

[54] PROCESS FOR THE PRODUCTION OF POLYAMIDE SHEET PRODUCTS

[75] Inventors: Werner Nielinger; August Böckmann; Hermann Brinkmeyer; Helmut Schulte, all of Krefeld, Fed. Rep. of Germany

[73] Assignee: Bayer Aktiengesellschaft, Leverkusen, Fed. Rep. of Germany

[21] Appl. No.: 380,392

[22] Filed: Jul. 17, 1989

[30] Foreign Application Priority Data

Jul. 27, 1988 [DE] Fed. Rep. of Germany ....... 3825411

[51] Int. Cl.$^5$ .............................................. C08G 69/16
[52] U.S. Cl. ................................ 264/564; 264/176.1; 264/211.21; 264/211.24; 264/331.19; 264/DIG. 61; 525/183; 528/324
[58] Field of Search ........... 264/176.1, 331.19, 211.21, 264/211.24, 143, DIG. 61, 564; 525/183; 528/324

[56] References Cited

U.S. PATENT DOCUMENTS

| | | | |
|---|---|---|---|
| 2,835,925 | 5/1958 | Proctor | 264/331.19 |
| 3,400,087 | 9/1968 | Robb et al. | 264/211 |
| 3,578,640 | 5/1971 | Twilley et al. | 264/176.1 |
| 3,664,980 | 5/1972 | Vertnik | 264/331.19 |
| 4,062,819 | 12/1977 | Mains et al. | 525/183 |
| 4,532,100 | 7/1985 | Lancaster et al. | 264/143 |
| 4,828,915 | 5/1989 | Schroeder et al. | 264/176.1 |
| 4,859,390 | 8/1989 | Fritsch et al. | 264/143 |
| 4,892,927 | 1/1990 | Meyer et al. | 528/324 |

FOREIGN PATENT DOCUMENTS

| | | | |
|---|---|---|---|
| 0288894 | 11/1988 | European Pat. Off. | |
| 908362 | 2/1954 | Fed. Rep. of Germany | 264/331.19 |
| 62-104730 | 5/1987 | Japan | 264/176.1 |
| 1305786 | 2/1973 | United Kingdom | |
| 1345001 | 1/1974 | United Kingdom | |

Primary Examiner—Jeffery Thurlow
Attorney, Agent, or Firm—Connolly and Hutz

[57] ABSTRACT

This invention relates to a process for the production of shrinkable sheet products from copolyamides with good processing properties. The copolyamides consist of ε-caprolactam and equimolar quantities of dimeric fatty acids and diamines.

6 Claims, No Drawings

PROCESS FOR THE PRODUCTION OF POLYAMIDE SHEET PRODUCTS

This invention relates to a process for the production of shrinkable sheet products of copolyamides with good processing properties.

Sheet products obtained from polyamides are distinguished by numerous advantageous properties, for example their high strength, toughness, transparency and brilliance. They are resistant to fats and oils and have a good barrier action against various gases and aromatic substances. By virtue of these properties, they are frequently used for packaging food stuffs and technical products. For the sake of appearance, it is desirable to use glass clear foils free from defects such as gels or pinholes.

The starting material used for the preparation of sheet products of polyamide 6 frequently contains nucleating agents and lubricants for the purpose of obtaining high draw off rates. These substances also enable polyamides of low molecular weight to be used, thereby reducing the risk of thermal damage to the polyamide.

U.S. Pat. No. 4,062,819 describes the addition of polyamides of diamines and relatively high molecular weight dicarboxylic acids, e.g. dimerised fatty acids, for improving the flow properties when processing the polyamides by injection moulding or extrusion. For the production of sheet products to be used for packaging material, such a polyamide mixture is not suitable since the end products obtained are cloudy and less brilliant with a poor capacity for deep drawing.

Polyamide 6 sheet products have little capacity for shrinkage and are therefore not suitable for packaging certain food stuffs such as sausages or boiled ham which are required to be wrapped very firmly. Polyamides based on ω-amino undecanoic acid or lauryllactam have been proposed for their improved capacity for shrinking, for example in DE-OS No. 19 05 539 and DE-OS No. 19 65 479. These polyamides are less suitable for the production of sheet products, especially for composite sheet products which can be sealed. Their low resistance to chemicals such as alcohols is also a disadvantage.

It has now surprisingly been found that the disadvantages mentioned above do not occur when a copolyamide of ε-caprolactam and from 0.5 to 15.0 parts by weight, preferably from 1.0 to 10.0 parts by weight, of units of a dimerised fatty acid (dimeric acid) and a diamine is used instead of an addition of polyamides of diamines and realtively high molecular weight dicarboxylic acids. The dimeric acid and diamine are used in approximately equivalent quantities, e.g. from 0.95:1 to 1:0.95, preferably from 0.98:1 to 1:0.98.

The dimerised fatty acids are prepared by catalytic condensation of unsaturated fatty acids, and any double bonds still present after the reaction may subsequently be hydrogenated. The dimerised fatty acids used are known and commercially available. Those products which are obtained from fatty acids containing from 16 to 20 carbon atoms and accordingly have an acid number of from 180 to 219 mg KOH/g are preferred. They may contain up to 3 parts by weight, preferably up to 2 parts by weight, of trimerised acid.

The following are examples of suitable diamines: hexamethylene diamine, 3-aminomethyl-3,5,5-trimethyl cyclohexylamine, 4,4'-diamino-dicyclohexylmethane, 4,4'-diamino-dicyclohexylpropane-(2,2), 4,4'-diamino-3,3'-dimethyl-dicyclohexylmethane, m-xylylenediamine and 2,2,4- or 2,4,4-trimethylhexamethylene diamine. Hexamethylene diamine and 3-aminomethyl-3,5,5-trimethylcyclohexylamine are preferred.

The copolyamides are prepared by the process known for the hydrolytic polymerisation of ε-caprolactam. They may be prepared batchwise in autoclaves or continuously in VK tubes.

The realtive viscosity of the copolyamides should be from 2.9 to 4.5, preferably from 3.2 to 4.0, determined on a 1% solution in m-cresol.

The copolyamides are suitable for the production of flat sheet products and blown films with high elongation on tearing as well as for the production of composite sheet products. Conventional single screw extruders with single pitch three-zone screws or high power screws fitted with shearing and mixing elements may advantageously be used. The total length of the screw should be at least 20 D, preferably not less than 24 D. The processing temperature is from 200° C. to 300° C., preferably from 220° C. to 260° C.

The process according to the invention enables sheet products with a thickness of from 10 to 50 μm, preferably from 15 to 25 μm, to be produced from high molecular weight polyamides at high draw off rates amounting to 50 to 180 m/min, preferably 80 to 150 m/min, even without the addition of nucleating agents. The risk of damage to the polyamide, even in high molecular weight products, is greatly reduced by the mild exposure to heat at the lower processing temperatures and highly transparent films with a good surface gloss and virtually free from surface defects are obtained.

The shrinkage of the sheet products, determined according to DIN No. 53 372, is substantially improved, being about twice that of polyamide 6 sheet products.

The sheet products may contain other known additives, e.g. stabilizers, light protective agents, dyes, pigments and optionally other processing auxiliaries or nucleating agents.

The sheet products may be used in the packaging industry. They are particularly suitable for technical packaging materials which are subjected to heavy wear and for the production of laminated products and products capable of being deep drawn.

EXAMPLES

1. A mixture of 258 g of ε-caprolactam, 31.4 g of ε-amino caproic acid, 12.2 g of dimerised fatty acid and 3.5 g of isophorone diamine is precondensed for 1 hour at 200° C. in a nitrogen atmosphere with stirring and then maintained at 270° C. for 5 hours. The solidified product is granulated, extracted three times with water at 90° C., each time for 4 hours, and dried.

The dimerised fatty acid is a trade product of Unichema International and has an acid number of 198 and a trimer content of 1.0%.

The relative viscosity of the polyamide, determined on a 1% solution in m-cresol at 25° C. in a Ubbelohde viscosimeter, is 3.4.

The molten copolyamide is completely clear. Transparent films up to considerable thicknesses can be produced from it.

COMPARISON EXAMPLE 1

Preparation of a Polyamide of Dimerised Fatty Acid and Hexamethylene Diamine.

528.8 g of the dimerised fatty acid from Example 1 and 103.3 g of hexamethylene diamine are heated with stirring in a nitrogen atmosphere, first to 200° C. for 1 hour and then to 270° C. for 2 hours. A transparent polyamide having a fusion maximum (DTA) of 83° C. and a relative viscosity of 1.5 is obtained.

5 parts of this polyamide and 95 parts of polyamide 6 having a relative viscosity of 3.5 are mixed together and worked up into films as in Example 1. Processing of the mixture is considerably more difficult than processing the copolyamide since the granulate is difficult to draw into the extruder. The melt of the mixture is slightly cloudy and the sheet products obtained are less transparent and less brilliant than sheet products obtained according to Example 1.

EXAMPLE 2

8300 g of $\epsilon$-caprolactam, 522 g of $\epsilon$-aminocaproic acid, 1020 g of dimerised fatty acid and 292 g of isophorone diamine are heated at atmospheric pressure in a nitrogen atmosphere with stirring, first at 210° C. for 1 hour and then at 270° C. for 7 hours. The copolyamide is then spun as a bristle through a water bath and after it has been granulated it is extracted four times with water at 90° C., each time for 3 hours, and dried. It has been relative viscosity of 3.5.

EXAMPLE 3

A copolyamide is prepared as described in Example 2 from 9050 g of $\epsilon$-caprolactam, 522 g of $\epsilon$-aminocaproic acid, 408 g of dimerised fatty acid and 117 g of isophorone diamine (proportion of polyamide 6:95% by weight).

Sheets 50 $\mu$m in thickness are produced from the products of Examples 2 and 3 by extrusion through a broad sheeting die of a single shaft extruder having a screw diameter of 45 mm. The free shrinkage of these sheet products is determined according to DIN No. 53 372 by stretching the sheets by 250% at room temperature and at 60° C. and then measuring the shrinkage after the sheets have been kept in water at 75° C. for three seconds.

The temperature adjusted for the production of the sheet products in the extruder, the temperature of the casting roller and the results obtained from the shrinkage measurements are shown in the following table. The comparison product is a polyamide 6 having a relative viscosity of 3.8.

TABLE

| Polyamide | Adjusted Temp. (°C.) | Roller Temp. (°C.) | Shrinkage Room Temp. (%) | 60° C. (%) |
|---|---|---|---|---|
| Example 2 | 210–220 | 35 | 11.4 | 16.1 |
| Example 3 | 220–230 | 45–60 | 9.8 | 12.2 |
| Polyamide 6 | 260 | 90 | 5.6 | 7.7 |

What is claimed is:

1. Process for the production of transparent sheet products comprising blowing or extruding a copolyamide comprising of from 85.0 to 99.5 parts by weight of units of $\epsilon$-caprolactam and from 0.5 to 15.0 parts by weight of units of equimolar quantities of dimerised fatty acids and diamines wherein said products are formed at a temperature of from 220° to 260° C. to form said product.

2. Process for the production of sheet products according to claim 1 wherein the dimerised fatty acid comonomer contains from 32 to 40 carbon atoms and less than 5 parts by weight if trimerised fatty acid.

3. Process for the production of flat sheet products according to claim 1 wherein the diamine used is hexamethylene diamine, 3-aminomethyl-3,5,5-trimethylcyclohexylamine or mixtures thereof.

4. Process for the production of flat sheet products according to claim 2 wherein the diamine used is hexamethylene diamine, 3-amino-methyl-3,5,5-trimethylcyclohexylamine or mixtures thereof.

5. Process according to claim 1 wherein the dimerised fatty acid comonomer contains 36 carbon atoms.

6. Process according to claim 1 wherein the dimerised fatty acid comonomer contains less than 3 parts by weight of trimerised fatty acid.

* * * * *